(12) United States Patent
Nomura et al.

(10) Patent No.: US 11,492,472 B2
(45) Date of Patent: Nov. 8, 2022

(54) RESIN COMPOSITION, MASTERBATCH PELLETS, AND MOLDED RESIN COMPOSITION PRODUCT AND METHOD FOR PRODUCING THE SAME

(71) Applicant: UBE MATERIAL INDUSTRIES, LTD., Ube (JP)

(72) Inventors: Ryoichi Nomura, Ube (JP); Kazuki Yoshihara, Ube (JP)

(73) Assignee: UBE MATERIAL INDUSTRIES, LTD., Ube (JP)

(*) Notice: Subject to any disclaimer, the term of this patent is extended or adjusted under 35 U.S.C. 154(b) by 74 days.

(21) Appl. No.: 16/333,406

(22) PCT Filed: Sep. 26, 2017

(86) PCT No.: PCT/JP2017/034786
§ 371 (c)(1),
(2) Date: Mar. 14, 2019

(87) PCT Pub. No.: WO2018/062200
PCT Pub. Date: Apr. 5, 2018

(65) Prior Publication Data
US 2020/0181377 A1    Jun. 11, 2020

(30) Foreign Application Priority Data
Sep. 29, 2016 (JP) .............................. JP2016-190749

(51) Int. Cl.
| C08L 23/12 | (2006.01) |
| C08L 23/06 | (2006.01) |
| C08L 53/00 | (2006.01) |
| C08K 3/30  | (2006.01) |
| C08K 3/36  | (2006.01) |
| C08K 7/08  | (2006.01) |
| C08J 3/22  | (2006.01) |
| C08J 3/12  | (2006.01) |
| B29C 45/00 | (2006.01) |
| C08K 5/098 | (2006.01) |

(52) U.S. Cl.
CPC .......... C08L 23/12 (2013.01); B29C 45/0001 (2013.01); C08J 3/12 (2013.01); C08J 3/226 (2013.01); C08K 3/30 (2013.01); C08K 3/36 (2013.01); C08K 5/098 (2013.01); C08K 7/08 (2013.01); C08L 23/06 (2013.01); C08L 53/00 (2013.01); C08K 2003/3063 (2013.01); C08K 2201/003 (2013.01)

(58) Field of Classification Search
CPC .......... C08L 23/12; C08L 23/06; C08L 53/00; C08K 3/30; C08K 3/36; C08K 7/08; C08J 3/22; C08J 3/312

USPC .......................................................... 524/423
See application file for complete search history.

(56) References Cited

U.S. PATENT DOCUMENTS

| 2011/0077336 A1* | 3/2011 | Takeuchi .............. C08L 53/025 524/315 |
| 2011/0230608 A1* | 9/2011 | Takeuchi ................. C08J 5/044 524/147 |
| 2011/0237709 A1 | 9/2011 | Takeuchi et al. |
| 2012/0029123 A1 | 2/2012 | Yamamoto et al. |

FOREIGN PATENT DOCUMENTS

| JP | 8-41257 A       |   | 2/1996  |
| JP | 2009114010 A    | * | 5/2009  |
| JP | 2010-90199 A    |   | 4/2010  |
| JP | 2011-144392 A   |   | 7/2011  |
| JP | 2011-153216 A   |   | 8/2011  |
| JP | 2011-202111 A   |   | 10/2011 |
| JP | 2011-214002 A   |   | 10/2011 |
| JP | 2012214709 A    | * | 11/2012 |
| JP | 5112157 B2      | * | 1/2013  |
| JP | 2015-13978 A    | * | 1/2015  |
| JP | 2015-13978 A    |   | 1/2015  |
| JP | 2016-191036 A   |   | 11/2016 |

OTHER PUBLICATIONS

International Search Report dated Oct. 24, 2017, issued in counterpart International Application No. PCT/JP2017/034786 (2 pages).
Takayama et al., "Effect of nano-sized silica particle dispersion on the mechanical properties of basic magnesium sulfate whisker filled polypropylene," Molding Symposium '15, pp. 235-236 (including English abstract), Nov. 2, 2015, cited in the specification.

* cited by examiner

*Primary Examiner* — Deve V Hall
(74) *Attorney, Agent, or Firm* — WHDA, LLP

(57) ABSTRACT

Provided are a resin composition and masterbatch pellets, which enable a molded resin composition product to improve both flexural modulus and Izod impact strength, and a molded resin composition product having both improved flexural modulus and improved Izod impact strength, and a method for producing the same. The resin composition includes 45 to 95 mass % of an olefin polymer, 1 to 50 mass % of fibrous basic magnesium sulfate, 0.00001 to 0.8 mass % of spherical silica particles, and 0.1 to 10 mass % of a lubricant. Also, the masterbatch pellets are for production of the resin composition by kneading the masterbatch pellets with a diluent containing olefin polymer, and the masterbatch pellets contain 10 to 50 mass % of an olefin polymer, 35 to 80 mass % of fibrous basic magnesium sulfate, 0.00005 to 5.0 mass % of spherical silica particles, and 0.5 to 10 mass % of a lubricant.

12 Claims, No Drawings

RESIN COMPOSITION, MASTERBATCH PELLETS, AND MOLDED RESIN COMPOSITION PRODUCT AND METHOD FOR PRODUCING THE SAME

FIELD OF THE INVENTION

The present invention relates to a resin composition, masterbatch pellets, and a molded resin composition product and processes for producing the same. In particular, the present invention relates to a resin composition, masterbatch pellets, and a molded resin composition product, which are preferably usable for exterior parts of automobiles, and processes for producing the same.

BACKGROUND OF THE INVENTION

A polyolefin resin typified by a polypropylene resin is widely used as a material for exterior or interior parts of automobiles, exterior parts of household electric appliances such as refrigerators and washing machines, and various molded products such as trays, shelving boards and packaging sheets. In order to improve the physical properties of the molded product such as rigidity and impact resistance, a polyolefin resin composition having a filler added to it, is generally used. The fillers to be used for such purposes commonly include fibrous inorganic fillers and non-fibrous inorganic fillers. Furthermore, a chemical agent such as an antioxidant or a lubricant are added to the polyolefin resin in order to satisfy various properties required after molding.

Molded resin composition products (the resin product) can be produced by combining the respective components and melt-kneading them to produce resin composition pellets, and molding the pellets by means of an injection molding machine and the like. They can be also produced by other methods such as preparing resin composition pellets (masterbatch pellets) containing a high content of a filler or the like and melt-kneading the resin composition pellets with separately produced resin pellets (dilute pellets) to forma resin composition, and molding the resin composition by means of an injection molding machine or the like. Another production method includes mixing the masterbatch pellets with dilute pellets, and directly molding the mixture by means of the injection molding machine.

Conventionally, as masterbatch pellets for an olefin resin containing a filler, resin composition pellets containing a fibrous inorganic filler, disclosed in Patent Document 1, are known. These resin composition pellets containing a fibrous inorganic filler include 1 to 45 mass % of olefin polymer, 35 to 80 mass % of fibrous inorganic filler, 5 to 45 mass % of an elastomer, and 0.3 to 10.0 mass % of a fatty acid or a metal salt of a fatty acid (refer to Claim 1). Patent Document 1 discloses that it is possible to produce a molded propylene polymer composition product having excellent bending elasticity and excellent impact resistance by using such resin composition pellets (refer to Abstract).

Further, Patent Document 2 discloses a filler composition including inorganic fibers made of inorganic material, and spherical silica particles having a volume average particle diameter of 0.01 or more and 5 μm or less (refer to claim 1). Patent Document 2 discloses that containing spherical silica particles not only makes it possible to easily disperse the inorganic fibers in the resin composition, but also improves the handleability of the filler composition itself (see Abstract).

Since weight reduction is required to improve fuel consumption of automobiles, the thinning of exterior parts such as fenders is required for automobiles. On the other hand, in order to protect drivers in the event of collision accidents and the like, enhancing the strength of the exterior parts is required. Accordingly, the molded resin composition product forming the exterior material must have both the properties of crack resistance to impacts and defamation resistance to bending, in addition to thinning.

In order to satisfy such properties, Non-Patent Document 1 discloses a resin composition including 15 mass parts of basic magnesium sulfate whiskers, 85 mass parts of a polypropylene resin, and 0.0015 to 1.5 mass parts of ADMANANO which are nanosized silica particles (sometimes called spherical silica particles). Non-Patent Document 1 discloses that this resin composition has the same flexural modulus (FM) and improved Izod impact strength as that of a composition system not containing spherical silica particles.

PRIOR ART

Patent Documents

Patent Document 1: Japanese Laid-Open Patent Application No. 2010-90199
Patent Document 2: Japanese Laid-Open Patent Application No. 2015-13978

Non-Patent Documents

Non-Patent Document 1: Effect of nano-sized silica particle dispersion on the mechanical properties of basic magnesium sulfate whisker filled polypropylene Filled With Basic Magnesium Sulfate Whiskers, Molding Symposium '15, pp. 235-236, Nov. 2, 2015

SUMMARY OF THE INVENTION

Problems to be Solved by the Invention

Non-Patent Document 1 discloses that Izod impact strength of the resin composition is improved while maintaining flexural modulus by blending basic magnesium sulfate whiskers, polypropylene resin and nanosized silica. However, there is a trade-off relationship between the flexural modulus and Izod impact strength. Accordingly, if one is improved, the other tends to deteriorate. Therefore, it is difficult to improve the flexural modulus and Izod impact strength at the same time.

It is an object of the present invention to provide a resin composition and masterbatch pellets capable of improving both the flexural modulus and the Izod impact strength of a molded resin composition product. Another object of the present invention is to provide a molded resin composition product improved in both flexural modulus and Izod impact strength and a method for producing the same.

Means for Solving the Problem

The present inventors have intensively studied in order to solve the above-mentioned problems and found that both the flexural modulus and Izod impact strength are improved by further combining a lubricant with the resin composition including an olefin polymer, fibrous basic magnesium sulfate and spherical silica particles, in order to complete the present invention.

Thus, according to the present invention, there is provided a resin composition, including 45 to 95 mass % of olefin polymer, 1 to 50 mass % of fibrous basic magnesium sulfate, 0.00001 to 0.8 mass % of spherical silica particles, and 0.1 to 10 mass % of lubricant.

The above-mentioned lubricant is preferably formed of a metal salt of a fatty acid. Furthermore, in this case, the lubricant is preferably formed of at least one member selected from the group consisting of magnesium stearate, calcium stearate, and aluminum stearate.

The above-mentioned spherical silica particles have preferably a sphericity of 0.7 or more and an average particle diameter of 1 to 1,000 nm.

Further, according to the present invention, there are provided masterbatch pellets for producing a resin composition by kneading the masterbatch pellets with a diluent containing an olefin polymer, including: 10 to 50 mass % of olefin polymer; 35 to 80 mass % of fibrous basic magnesium sulfate; 0.00005 to 5.0 mass % of spherical silica particles; and 0.5 to 10 mass % of lubricant.

Still further, according to the present invention, there is provided a molded product of the above-described resin composition.

Further, according to the present invention, there is provided a method of producing a molded resin composition product, which includes molding the above-described resin composition.

Still further, according to the present invention, there is provided a method of producing a molded resin composition product, which includes mixing a diluent containing an olefin polymer and the above-mentioned masterbatch pellets to prepare a mixture, and molding the mixture to directly form a molded resin composition product via a molding machine.

Advantages of the Invention

According to the present invention, there are provided a resin composition and masterbatch pellets, which enable a molded resin composition product to improve both the flexural modulus and the Izod impact strength. Further, according to the present invention, there are provided a molded resin composition product having improved flexural modulus and Izod impact strength, and a method for producing the same.

PREFERRED EMBODIMENTS OF THE INVENTION

1. Resin Composition

The resin composition of the present invention will be described below. The resin composition of the present invention includes 45 to 95 mass % of olefin polymer, 1 to 50 mass % of fibrous basic magnesium sulfate, 0.00001 to 0.8 mass % of spherical silica particles, and 0.1 to 10 mass % of lubricant. Each component of the resin composition will be described below.

(1) Olefin Polymer

As the olefin polymer, an ethylene polymer, a propylene homopolymer, a random copolymer, a block copolymer and the like can be exemplified. In particular, propylene polymer is preferable, and block copolymer is more preferable. One olefin polymer can be used alone. Otherwise, two or more olefin polymers can be used in mixture. The olefin polymer has a melt flow rate (MFR) of generally 3 to 300 g/10 minutes, and preferably in the range of 10 to 100 g/10 minutes.

The content of the olefin polymer is in the range of 45 to 95 mass %, preferably in the range of 50 to 95 mass %, and more preferably in the range of 60 to 90 mass % based on the total amount of the resin composition. When the content of the olefin polymer falls below 45 mass %, the proportion of the olefin polymer contained in the resin composition is relatively lowered, so that the molded resin composition product obtained by molding this olefin polymer tends toward poor flexibility. On the other hand, when the content of the olefin polymer exceeds 95 mass %, the flexural modulus and Izod impact strength tend to be low.

(2) Fibrous Basic Magnesium Sulfate

The fibrous basic magnesium sulfate can be produced, as an example, by means of hydrothermal synthesis using as raw materials magnesium hydroxide, which is produced from seawater, and magnesium sulfate. The fibrous basic magnesium sulfate has an average major axis of generally 2 to 100 μm, preferably 5 to 30 μm and an average minor axis of generally 0.1 to 2.0 μm, preferably 0.1 to 1.0 μm.

The fibrous basic magnesium sulfate has an average aspect ratio (average major axis/average minor axis) of generally 2 or more, preferably 5 or more, particularly preferably 5 to 50. The average major axis and average minor axis of the fibrous basic magnesium sulfate can be calculated using average values of the major axes and the minor axes of 100 particles, measured based on enlarged images obtained by a scanning electron microscope (SEM). In addition, the fibrous basic magnesium sulfate may be an aggregate or a combination of a plurality of fibrous particles.

The content of the fibrous basic magnesium sulfate is in the range of 1 to 50 mass %, preferably in the range of 5 to 40 mass %, and more preferably in the range of 5 to 30 mass % based on the total amount of the resin composition. When the content of the fibrous basic magnesium sulfate falls below 1 mass %, the proportion of the fibrous basic magnesium sulfate contained in the resin composition becomes relatively low, so that the resulting molded resin composition product tends to have both a low flexural modulus and low Izod impact strength. On the other hand, when the content of the fibrous basic magnesium sulfate exceeds 50 mass %, the proportion of the fibrous basic magnesium sulfate contained in the resin composition becomes too high, so that the proportions of the spherical silica and the lubricant mentioned below become relatively low, and in addition, both the flexural modulus and the Izod impact strength tend to be low.

(3) Spherical Silica Particles

The spherical silica particles are silica particles each having a spherical shape. The spherical silica particles each has a sphericity of generally 0.7 to 1, preferably 0.8 to 1. "Sphericity" can be calculated by the equation "sphericity=$4\pi\times$projected area/(perimeter)$^2$" in which the projected area and perimeter of particles are measured from an image shot by a scanning electron microscope (SEM). The value of the sphericity is determined by calculating the average of the sphericities of 100 particles in which the sphericity of each particle is determined by measuring the cross section area and perimeter of particles by means of image analysis of an enlarged image shot by a scanning electron microscope (SEM).

The spherical silica particles have an average particle diameter of generally 1 to 1,000 nm, preferably 5 to 100 nm, more preferably 10 to 50 nm. When the average particle diameter falls below 1 nm, the spherical silica particles are too fine, so that it is difficult for the spherical silica particles to be uniformly dispersed in the resin composition. On the other hand, when the average particle diameter exceeds 1,000 nm, the spherical silica particles are too large, so that the Izod impact strength and the flexural modulus of the obtained molded resin composition product tends to be low.

It is desirable to surface-treat the spherical silica particles to improve the dispersibility thereof. The method of the surface-treatment is not limited. Regarding the dispersion of the spherical silica particles in the resin composition, the method includes, for example, a method of imparting a functional group having a high affinity to the resin to the spherical silica particles, and a method of imparting a functional group having a high reactivity with the resin to the spherical silica particles. A surface treatment agent includes a silane coupling agent, a silane treatment agent such as organosilazane, a titanate coupling agent, and an aluminate coupling agent. It is possible to use two of these surface treatment agents in combination. In this case, it is preferred that untreated spherical silica particles are treated with a silane coupling agent and then the surface-treated spherical silica particles are treated with organosilazane.

The content of the spherical silica particles ranges 0.00001 to 0.8 mass %, preferably 0.0001 to 0.1 mass %, more preferably 0.001 to 0.08 mass % based on the total amount of the resin composition. When the content of the spherical silica particles falls below 0.0001 mass %, the content of the spherical silica particles contained in the resin composition is relatively lowered, so that both the Izod impact strength and the flexural modulus of the molded resin composition product obtained by molding the resin composition tend to be low. On the other hand, when the content of the spherical silica particles exceeds 0.8 mass %, the rate of the spherical silica contained in the resin composition becomes relatively too high, so that the flexural modulus and the Izod impact strength tend to be low.

As for details about the spherical silica particles, refer to Japanese Laid-Open Patent Application No. 2015-13978.

(4) Lubricant

The lubricant is a component for reducing the friction among the fibrous basic magnesium sulfate, the spherical silica particles and the like, which are contained in the resin composition. In the present invention, the lubricant has functions for improving both of the Izod impact strength and the flexural modulus. In terms of improving these properties, the preferred lubricant is a metal salt of a fatty acid. The preferred fatty acid has 12 to 22 carbon atoms. The fatty acid may be either a saturated fatty acid or an unsaturated fatty acid. Examples of the saturated fatty acids include a lauric acid, a tridecanoic acid, a myristic acid, a pentadecanoic acid, a palmitic acid, a margaric acid, a stearic acid, a nonadecanoic acid, an arachidic acid, a behenic acid and the like. Examples of the unsaturated fatty acids include a myristoleic acid, a palmitoleic acid, an oleic acid, an elaidic acid, a vaccenic acid, a gadoleic acid, and an erucic acid. The metal salt includes a magnesium salt, a calcium salt, an aluminum salt, a lithium salt, a zinc salt and the like. The preferred lubricant of the present invention is at least one member selected from the group consisting of magnesium stearate, calcium stearate, and aluminum stearate.

The content of the lubricant ranges 0.1 to 10 mass %, preferably 0.1 to 6 mass %, and more preferably 0.2 to 4 mass % based on the total amount of the resin composition. When the content of the lubricant falls to below 0.1 mass %, the proportion of the lubricant contained in the resin composition is relatively lowered, so that the Izod impact strength and the flexural modulus of the molded resin composition product obtained by molding the resin composition tend to be low. On the other hand, when the content of the lubricant exceeds 10 mass %, the proportion of the lubricant contained in the resin composition becomes relatively too high, so that the flexural modulus and the Izod impact strength tend to be low.

The resin composition can further contain other components as long as they do not hinder the effects of the present invention. Examples of the other components include oxidation inhibitors, ultraviolet absorbers, pigments, antistatic agents, anti-copper agents, frame retarders, neutralizers, foaming agents, plasticizers, nucleating agents, anti-foaming agents, and cross-linking agents.

2. Masterbatch (MB) Pellet

Next, there will be described the masterbatch pellets. The masterbatch pellets of the present invention are a raw material for producing the resin composition by kneading them with a diluent containing olefin polymer. In the present invention, the masterbatch pellets contain 10 to 50 mass % of the olefin polymer, 35 to 80 mass % of the fibrous basic magnesium sulfate, 0.00005 to 5.0 mass % of the spherical silica particles, and 0.5 to 10 mass % of the lubricant. Preferably, the masterbatch pellets contain 20 to 50 mass % of the olefin polymer, 50 to 75 mass % of the fibrous basic magnesium sulfate, 0.00005 to 5.0 mass % of the spherical silica particles, and 0.5 to 10 mass % of the lubricant. More preferably, the masterbatch pellets contain 25 to 50 mass % of the olefin polymer, 50 to 70 mass % of the fibrous basic magnesium sulfate, 0.00005 to 5.0 mass % of the spherical silica particles, and 0.5 to 10 mass % of the lubricant. Since the olefin polymer, the fibrous basic magnesium sulfate, the spherical silica particles, and the lubricant are described above, the details of these components are omitted.

3. Molded Resin Composition Product

Next, there will be described a molded resin composition product. The molded resin composition product of the present invention is produced by molding the above-mentioned resin composition. The molded resin composition product of the present invention has the excellent properties of high Izod impact strength and high flexural modulus. The molding method will be described in detail in the following description of the manufacturing method.

(1) Izod Impact Strength

Izod impact strength is an index showing a strength against impact of a molded resin composition product. The values of the Izod impact strength in the present specification can be defined as the results measured by the method described in the following Examples. Specifically, the values of the Izod impact strength are results measured by using a pendulum impact testing machine according to the procedure in conformity to JIS-K7110.

(2) Flexural Modulus

Flexural modulus is an index showing a resistance to deformation of a molded resin composition product. The values of the flexural modulus in the present specification can be defined as the results measured by the method described in the following Examples. Specifically, the values of the flexural modulus are results measured by using a motorized test stand according to the procedure in conformity to JIS-K7171.

4. Method for Producing Molded Resin Composition Product

The molded resin composition product can be produced by molding the above-mentioned resin composition. The method for molding the resin composition includes a method comprising mixing components of the resin composition to form the resin composition and molding it, a method comprising melt-kneading masterbatch pellets and diluent pellets (diluent) to prepare a resin composition and molding it, and a method comprising mixing masterbatch pellets and diluent pellets to prepare a mixture and directly molding it via a molding machine. The diluent includes the above-mentioned resin containing olefin polymer. The molding machine to be used includes, for example, a press machine (calender molding machine, etc.), a vacuum molding machine, an extruding machine, an injection molding machine, a blow molding machine, a press molding machine, and the like.

EXAMPLE

The present invention will be specifically described based on the following examples, but these examples do not limit the object of the present invention, and the present invention is not limited to these examples.

1. Evaluation of Properties

Properties of test samples are evaluated by the following method.

Notching: notching machine (IMC-AOCA, made by Imoto machinery Co. LTD.)

Izod impact strength: measured by a Pendulum impact testing machine (impact testing machine No. 511, made by MYS-TESTER Company Limited) in conformity to JIS-K7110.

Flexural modulus (FM): measured by a Motorized test stand (MX-500N, made by IMADA CO., LTD.), three point bending test in conformity to JIS-K7171

MFR: measured by a Melt indexer (F-F01 type, made by Toyo Seiki Seisaku-sho, Ltd.) at a temperature of 230° C. under a load of 2.16 kg in conformity to ASTM-D1238

2. Example 1

(1) Production of the Masterbatch (Hereinafter, Referred to as MB) Pellets 30 mass parts of a polypropylene resin [block copolymer, MFR: 47 g/10 min.], 70 mass parts of fibrous basic magnesium sulfate (MOS-HIGE® A-1, average major axis: 15 μm, average minor axis: 0.5 μm, made by Ube Material Industries, Ltd.), 0.007 mass parts of spherical silica particles (ADMANANO, average particle diameter 10 nm (measured by a scanning electron microscope (SEM)), made by Admatechs Company Limited), and 2.1 mass parts of magnesium stearate were blended. After the obtained mixture was kneaded, MB pellets were produced.

(2) Dilution of MB Pellets and Molding of the Test Sample

The MB pellets produced in paragraph (1) and a polypropylene resin [block copolymer, MFR: 47 g/10 min.] were mixed so that a mass ratio of the polypropylene resin to the fibrous basic magnesium sulfate is a mass ratio of 85:15. The mixture was directly molded at a temperature of 230° C. by an electric injection molding machine (C. Mobile 0813, made by Shinko Sellbic Co., Ltd.) to prepare a test sample for evaluation of the physical properties.

3. Example 2

A test sample for evaluation of physical properties was prepared in the same manner as in Example 1 except that the amount of the spherical silica particles was 0.070 mass parts for the Production of MB pellets in Example 1(1).

4. Example 3

A test sample for evaluation of physical properties was prepared in the same manner as in Example 1 except that the amount of the spherical silica particles was 0.700 mass parts for the Production of MB pellets in Example 1(1).

5. Example 4

A test sample for evaluation of physical properties was prepared in the same manner as in Example 1 except that the amount of the spherical silica particles was 3.500 mass parts for the Production of MB pellets in Example 1(1).

6. Example 5

A test sample for evaluation of physical properties was prepared in the same manner as in Example 1 except that the amount of the spherical silica particles was 0.00007 mass parts for the Production of MB pellets in Example 1(1).

7. Example 6

A test sample for evaluation of physical properties was prepared in the same manner as in Example 1 except that the amount of the spherical silica particles was 0.00035 mass parts for the Production of MB pellets in Example 1(1).

8. Example 7

A test sample for evaluation of physical properties was prepared in the same manner as in Example 1 except that the amount of the spherical silica particles was 0.0007 mass parts for the Production of MB pellets in Example 1(1).

9. Example 8

A test sample for evaluation of physical properties was prepared in the same manner as in Example 1 except that the amount of the spherical silica particles was 0.0035 mass parts for the Production of MB pellets in Example 1(1).

10. Example 9

A test sample for evaluation of physical properties was prepared in the same manner as in Example 1 except that the amounts of polypropylene resin, fibrous basic magnesium sulfate, spherical silica particles and magnesium stearate were 40 mass parts, 60 mass parts, 0.600 mass parts and 1.80 mass parts, respectively, for the Production of MB pellets in Example 1(1).

11. Example 10

(1) Production of Resin Composition 85 mass parts of a polypropylene resin [block copolymer, MFR: 47 g/10 min.], 15 mass parts of fibrous basic magnesium sulfate (MOS-HIGE® A-1, average major axis: 15 μm, average minor axis: 0.5 μm, made by Ube Material Industries, Ltd.), 0.015 mass parts of spherical silica particles (ADMANANO, average diameter: 10 nm (measured by a scanning electron microscope (SEM)), made by Admatechs Company Limited), and 0.45 mass parts of magnesium stearate were blended. After the obtained mixture was kneaded, the resin composition pellets were produced.

(2) Molding of Test Sample

The resin composition pellets were injection-molded at a temperature of 230° C. by an electric injection molding machine (C. Mobile 0813, made by Shinko Sellbic Co., Ltd.) to prepare a test sample for evaluation of the physical properties.

12. Comparative Example 1

A test sample for evaluation of physical properties was prepared in the same manner as in Example 10 except that the spherical silica particles was not added for the Production of Resin Composition Pellets in Example 10(1).

13. Comparative Example 2

A test sample for evaluation of physical properties was prepared in the same manner as in Example 10 except that the magnesium stearate was not added for the Production of Resin Composition Pellets in Example 10(1).

14. Comparative Example 3

A test sample for evaluation of physical properties was prepared in the same manner as in Example 10 except that the spherical silica particles and the magnesium stearate were not added for the Production of Resin Composition Pellets in Example 10(1).

15. Comparative Example 4

A test sample for evaluation of physical properties was prepared in the same manner as in Example 1 except that the spherical silica particles was not added for the Production of MB Pellets in Example 1(1).

16. Comparative Example 5

A test sample for evaluation of physical properties was prepared in the same manner as in Example 1 except that the amount of the spherical silica particles was 7.000 mass parts for the Production of MB pellets in Example 1(1).

17. Comparative Example 6

A test sample for evaluation of physical properties was prepared in the same manner as in Example 1 except that the amount of the spherical silica particles was 21.00 mass parts for the Production of MB pellets in Example 1(1).

18. Comparative Example 7

A test sample for evaluation of physical properties was prepared in the same manner as in Example 1 except that the spherical silica particles and the magnesium stearate were not added for the Production of MB Pellets in Example 1(1).

19. Comparative Example 8

A test sample for evaluation of physical properties was prepared in the same manner as in Example 1 except that the magnesium stearate was not added for the Production of MB Pellets in Example 1(1).

20. Comparative Example 9

A test sample for evaluation of physical properties was prepared in the same manner as in Example 2 except that the magnesium stearate was not added for the Production of MB Pellets in Example 2(1).

21. Comparative Example 10

A test sample for evaluation of physical properties was prepared in the same manner as in Example 3 except that the magnesium stearate was not added for the Production of MB Pellets in Example 3(1).

The following Table summarizes the results of the above-mentioned Examples and Comparative Examples. In the Table, "PP" denotes polypropylene resin, "MOS" denotes fibrous basic magnesium sulfate, "$SiO_2$" denotes spherical silica particles, "StMg" denotes a lubricant, "MB components" denotes a composition of a masterbatch, "Izod" in "Properties of Resin Composition" denotes an Izod impact strength, and "FM" denotes a flexural modulus.

TABLE 1

| | MB Components (total 100 mass %) | | | | Resin Composition Conponents (total 100 mass %) | | | | Properties of Resin Composition | |
|---|---|---|---|---|---|---|---|---|---|---|
| | PP (mass %) | MOS (mass %) | $SiO_2$ (mass %) | StMg (mass %) | PP (mass %) | MOS (mass %) | $SiO_2$ (mass %) | StMg (mass %) | Izod (kJ/m$^2$) | FM (Mpa) |
| Example 5 | 29.38 | 68.56 | 0.00007 | 2.06 | 84.62 | 14.93 | 0.000015 | 0.45 | 5.1 | 2860 |
| Example 6 | 29.38 | 68.56 | 0.00034 | 2.06 | 84.62 | 14.93 | 0.000075 | 0.45 | 6.2 | 3240 |
| Example 7 | 29.38 | 68.56 | 0.00069 | 2.06 | 84.62 | 14.93 | 0.00015 | 0.45 | 6.1 | 3250 |
| Example 8 | 29.38 | 68.56 | 0.0034 | 2.06 | 84.62 | 14.93 | 0.00075 | 0.45 | 5.5 | 3160 |
| Example 1 | 29.38 | 68.56 | 0.0069 | 2.06 | 84.62 | 14.93 | 0.0015 | 0.45 | 6.6 | 3300 |
| Example 2 | 29.36 | 68.51 | 0.069 | 2.06 | 84.61 | 14.93 | 0.015 | 0.45 | 5.3 | 3160 |
| Example 3 | 29.18 | 68.09 | 0.68 | 2.04 | 84.49 | 14.91 | 0.15 | 0.45 | 5.5 | 3060 |
| Example 4 | 28.41 | 66.29 | 3.31 | 1.99 | 83.99 | 14.82 | 0.74 | 0.44 | 5.7 | 2890 |
| Example 9 | 39.09 | 58.59 | 0.59 | 1.76 | 84.49 | 14.91 | 0.15 | 0.45 | 7.1 | 3070 |
| Example 10 | — | — | — | — | 84.49 | 14.91 | 0.15 | 0.45 | 4.6 | 2850 |
| Comparative Example 1 | — | — | — | — | 84.62 | 14.93 | — | 0.45 | 4.2 | 2730 |
| Comparative Example 2 | — | — | — | — | 84.87 | 14.98 | 0.15 | — | 2.9 | 2890 |
| Comparative Example 3 | — | — | — | — | 85.00 | 15.00 | — | — | 2.4 | 2740 |
| Comparative Example 4 | 29.38 | 68.56 | — | 2.06 | 84.62 | 14.93 | — | 0.45 | 3.9 | 3040 |
| Comparative Example 5 | 27.50 | 64.16 | 6.42 | 1.92 | 83.37 | 14.71 | 1.47 | 0.44 | 4.0 | 2710 |
| Comparative Example 6 | 24.37 | 56.86 | 17.06 | 1.71 | 80.99 | 14.29 | 4.29 | 0.43 | 4.0 | 2500 |
| Comparative Example 7 | 30.00 | 70.00 | — | — | 85.00 | 15.00 | — | — | 2.2 | 2450 |

TABLE 1-continued

|  | MB Components (total 100 mass %) | | | | Resin Composition Conponents (total 100 mass %) | | | | Properties of Resin Composition | |
| --- | --- | --- | --- | --- | --- | --- | --- | --- | --- | --- |
|  | PP (mass %) | MOS (mass %) | SiO$_2$ (mass %) | StMg (mass %) | PP (mass %) | MOS (mass %) | SiO$_2$ (mass %) | StMg (mass %) | Izod (kJ/m$^2$) | FM (Mpa) |
| Comparative Example 8 | 30.00 | 70.00 | 0.0070 | — | 85.00 | 15.00 | 0.0015 | — | 3.0 | 2620 |
| Comparative Example 9 | 29.98 | 69.95 | 0.070 | — | 84.99 | 15.00 | 0.015 | — | 2.8 | 2860 |
| Comparative Example 10 | 29.79 | 69.51 | 0.70 | — | 84.87 | 14.98 | 0.15 | — | 2.1 | 3200 |

The invention claimed is:

1. A resin composition, comprising: 45 to 95 mass % of an olefin polymer; 1 to 50 mass % of fibrous basic magnesium sulfate; 0.00001 to 0.8 mass % of spherical silica particles having an average particle diameter of 5 to 100 nm; and 0.1 to 10 mass % of a lubricant based on a total mass of the resin composition,
wherein a mass ratio of fibrous basic magnesium sulfate to the spherical silica particles is 14.93/0.000015 to 14.82/0.74, and a mass ratio of the spherical silica particles to the lubricant is 0.000015/0.45 to 0.74/0.44.

2. The resin composition according to claim 1, wherein said lubricant is a metal salt of a fatty acid.

3. The resin composition according to claim 2, wherein said lubricant is at least one member selected from the group consisting of magnesium stearate, calcium stearate, and aluminum stearate.

4. The resin composition according to claim 2, wherein said spherical silica particles have a sphericity of 0.7 or more.

5. A molded resin composition product which is a molded product of the resin composition according to claim 1.

6. A molded resin composition product which is a molded product of the resin composition according to claim 2.

7. A molded resin composition product which is a molded product of the resin composition according to claim 3.

8. A molded resin composition product which is a molded product of the resin composition according to claim 4.

9. A method for producing a molded resin composition product, comprising molding the resin composition according to claim 1 into a molded resin composition product.

10. A method for producing a molded resin composition product, comprising molding the resin composition according to claim 2 into a molded resin composition product.

11. A method for producing a molded resin composition product, comprising molding the resin composition according to claim 3 into a molded resin composition product.

12. A method for producing a molded resin composition product, comprising molding the resin composition according to claim 4 into a molded resin composition product.

* * * * *